W. B. STEEN.
SHAFT COUPLING.
APPLICATION FILED AUG. 13, 1908.
913,992.
Patented Mar. 2, 1909.
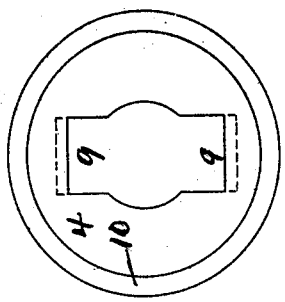
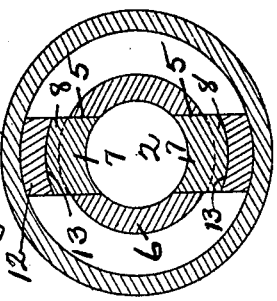
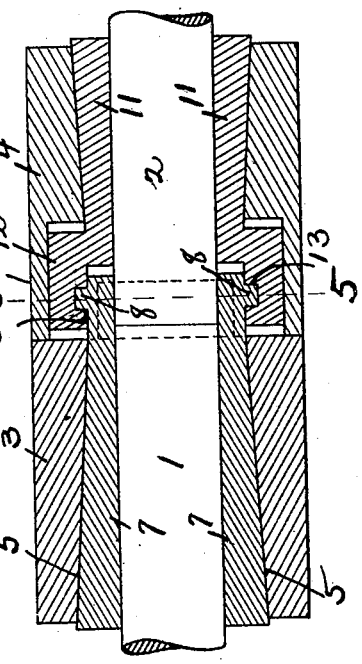
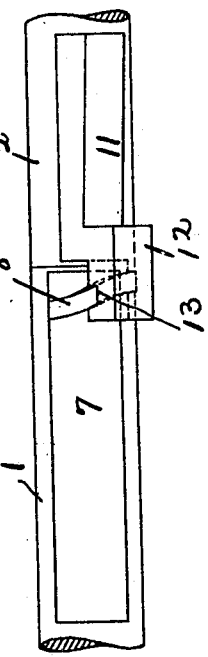
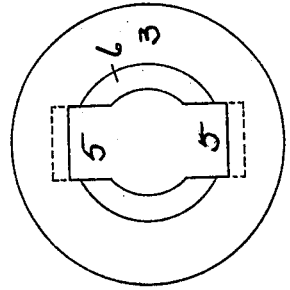
Witnesses
J. J. Hogan
Chas Avril
Inventor
William B. Steen
Attorney

UNITED STATES PATENT OFFICE.

WILLIAM B. STEEN, OF ERIE, PENNSYLVANIA.

SHAFT-COUPLING.

No. 913,992.  Specification of Letters Patent.  Patented March 2, 1909.

Application filed August 13, 1908. Serial No. 448,280.

*To all whom it may concern:*

Be it known that I, WILLIAM B. STEEN, a citizen of the United States, residing at Erie, in the county of Erie and State of Pennsylvania, have invented new and useful Improvements in Shaft-Couplings, of which the following is a specification.

This invention relates to shaft couplings, and consists in certain improvements in the construction thereof as will be hereinafter fully described and pointed out in the claims.

A feature of the invention is the utilization of the relative movement of the shafts for setting the coupling. In this way the power of the driving shaft may be utilized for setting the coupling, and the set of the coupling is proportioned largely to load the coupling carriers, so that it automatically effects such an engagement of the shaft as will prevent slippage.

The invention is illustrated in the accompanying drawings as follows:

Figure 1 is a central longitudinal section of the coupling. Fig. 2 is an end view of the male sleeve of the coupling. Fig. 3 is an end view of the female sleeve of the coupling. Fig. 4 is an elevation of two shafts with the locking keys or wedges in place thereon, the sleeves being removed to better show construction. Fig. 5 is a section on the line 5—5 in Fig. 1.

Either shaft may be the driving shaft, but for convenience of description I will term the shaft 1 as the driving shaft, and the shaft 2 as the driven shaft. A sleeve 3 is arranged on the driving shaft, and an opposing sleeve 4 on the driven shaft. The sleeve 3 has the tapered socket 5 extending through it, the larger end of the socket being at the outer end of the sleeve, or at the left as shown in Fig. 1. The sleeve has an extension 6 which extends over the end of the shaft 2, the purpose being to aid in alining the shafts.

The locking pieces 7 are wedge shaped to fit the sockets 5, and to engage the shaft 1. It will readily be observed that as the locking pieces 7 are forced in an axial direction into the socket, the pressure of the engagement with the shaft increases. These locking pieces are provided with the male screw threads or cams 8 at their inner ends, or ends next to opposing sleeve 4. The sleeve 4 has the sockets 9 opposing the socket 5. The inner end of the sleeve has a projecting shell 10 which covers the locking portions of the locking devices. The locking pieces 11 are wedge shaped and arranged in the sockets 9 and operate in the same manner as the locking pieces 7. Their inner ends have the extension 12 which overlaps the ends of the locking pieces 7, and they are provided with the female screw threads or cams 13 arranged to engage and operate upon the threads 8. The locking pieces are so proportioned that they will engage the shafts just as the screw threads on the locking pieces enter. By continuing the turning movement of the sleeves, the locking pieces are moved axially, so as to increase the pressure of engagement. Any convenient device may be used for turning the sleeves 3 and 4 to effect this initial engagement.

When the driving shaft is put in motion, the locking pieces have sufficient engagement with it to turn them with the shaft, and the locking pieces 11 have sufficient engagement with the driven shaft to hold them with the shaft. If therefore, there is any relative movement between the shafts, the locking pieces are drawn in an axial direction through the screw thread mechanism, so that the pressure on the shafts is increased. The taper locking pieces are so proportioned that relative movement between the shafts is stopped before the limit of the screw thread is reached.

What I claim as new is:

1. In a shaft coupling, the combination of sleeves having tapered sockets adapted to surround two alined shafts; locking devices in said sleeves for engaging the shafts; and means actuated by a relative movement of the shafts for shifting the locking devices in the sockets to increase the pressure of the engagement.

2. In a shaft coupling, the combination of sleeves having tapered sockets; wedge shaped locking devices arranged in the sockets for engaging the shafts; and means actuated by the relative movement of the shafts for shifting the locking devices in the sockets to increase the pressure of engagement in the shafts.

3. In a shaft coupling, the combination of sleeves having tapered sockets adapted to surround two alined shafts; locking devices on said shafts for engaging the shafts; and a screw threaded mechanism on said locking devices for shifting the locking devices in the sockets as said devices are rotated relatively to each other to increase the pressure of the engagement of said devices on the shaft.

4. In a shaft coupling, the combination of sleeves having tapered sockets; wedge shaped locking devices in said sockets for engaging the shafts; and screw threaded mechanisms on said locking devices adapted to move said devices axially as said devices are rotated relatively to each other for increasing the pressure of the engagement of said devices on the shafts.

5. In a shaft coupling, the combination of a tapered sleeve having a tapered socket adapted to surround one of two alined shafts; a locking device in said socket for engaging a shaft; and means actuated by a relative movement of the shafts for shifting the locking device in the socket and on the shaft to increase the pressure of the engagement of the device on the shaft.

6. In a shaft coupling, the combination of a device for directly engaging one of two alined shafts; a screw threaded mechanism on said device acting with a relative movement of the shafts for moving said device axially to increase the pressure of the engagement on the shaft, and to ultimately lock the shafts against relative movement.

7. In a shaft coupling, the combination of the sleeves 3 and 4 surrounding two alined shafts, said sleeves having the tapered sockets 5 and 9 extending axially through them; the tapered locking pieces 7 and 11 in said sockets; and screw threaded mechanisms on the adjoining ends of the locking pieces adapted to move said locking pieces axially to each other.

8. In a shaft coupling, the combination of a sleeve having a tapered socket therein; a wedge shaped locking piece arranged in the socket, said locking piece being adapted to engage one of two alined shafts; a screw threaded mechanism on the end of the locking piece; and a screw threaded mechanism adapted to be mounted on the opposing alined shaft and adapted to engage and actuate said locking piece.

9. In a shaft coupling, the combination of a sleeve having a tapered socket therein, said sleeve being adapted to surround one of two alined shafts and having a reduced extension adapted to extend over in contact with a second shaft to maintain said second shaft in alinement; a locking piece for said socket; and means actuated by the relative movement of the shafts for moving said locking piece axially in the socket to increase the pressure of its engagement on the shaft.

10. In a shaft coupling, the combination of the sleeves 3 and 4, the sleeve 4 having the shell 10, and said sleeves having the tapered sockets therein; locking pieces in said sockets; and a screw threaded mechanism on the adjoining ends of the locking pieces and within the shell 10, said screw threaded mechanisms being adapted to move the locking pieces axially as they are rotated relatively to each other for the purpose described.

11. In a shaft coupling, the combination of the sleeves 3 and 4, the sleeve 4 having the shell 10, and said sleeves having the tapered sockets therein; locking pieces in said sockets; a screw threaded mechanism on the adjoining ends of the locking pieces and within the shell 10, said screw-threaded mechanisms being adapted to move the locking pieces axially as they are rotated relatively to each other for the purpose described; and the extension 6 on the sleeve 3 for the purpose described.

In testimony whereof I have hereunto set my hand in the presence of two subscribing witnesses.

WILLIAM B. STEEN.

Witnesses:
K. R. KANE,
V. C. HESS.